US 6,696,197 B2

(12) United States Patent
Inagaki et al.

(10) Patent No.: US 6,696,197 B2
(45) Date of Patent: Feb. 24, 2004

(54) BATTERY PACK AND PORTABLE ELECTRONIC APPLIANCE (75) Inventors: Hiroki Inagaki, Kawasaki (JP); Norio Takami, Yokohama (JP); Tatsuoki Kohno, Tokyo (JP); Tomokazu Morita, Funabashi (JP); Haruchika Ishii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 312 days.

(21) Appl. No.: 09/956,807

(22) Filed: Sep. 21, 2001

(65) Prior Publication Data
US 2002/0061436 A1 May 23, 2002

(30) Foreign Application Priority Data

Sep. 29, 2000 (JP) .......................................... 2000-301303

(51) Int. Cl.$^7$ ............................................. H01M 10/50
(52) U.S. Cl. ............................. 429/120; 429/7; 429/99; 429/100; 429/152; 429/153; 429/158; 429/159; 429/162; 429/163; 361/679; 361/681; 361/683; 361/687; 361/688; 361/704; 361/705; 361/706; 361/709
(58) Field of Search ..................... 429/120, 7, 99, 429/100, 152, 153, 158, 159, 162, 163; 361/679, 681, 683, 687, 688, 704, 705, 706, 709

(56) References Cited

U.S. PATENT DOCUMENTS

| 4,092,464 | A | | 5/1978 | Dey et al. .................... 429/127 |
| 5,422,200 | A | | 6/1995 | Hope et al. .................. 429/157 |
| 5,898,567 | A | * | 4/1999 | Satake ......................... 361/687 |
| 6,225,778 | B1 | * | 5/2001 | Hayama et al. .............. 320/112 |
| 6,297,956 | B1 | * | 10/2001 | Janik et al. .................. 361/687 |
| 6,377,030 | B1 | * | 4/2002 | Asao et al. .................. 320/161 |
| 6,451,474 | B1 | * | 9/2002 | Kozu et al. .................. 429/100 |
| 6,455,186 | B1 | * | 9/2002 | Moores, Jr. et al. .......... 429/71 |
| 6,524,732 | B1 | * | 2/2003 | Iwaizono et al. .............. 429/7 |

* cited by examiner

Primary Examiner—Bruce F. Bell
(74) Attorney, Agent, or Firm—Oblon, Spivak, McClelland, Maier & Neustadt, P.C.

(57) ABSTRACT

Disclosed is a battery pack, comprising a secondary battery unit including at least one secondary battery, the at least one secondary battery comprising an electrode group and an insulating case having the electrode group housed therein, and the battery pack further comprising a heat conductive sheet which is provided at at least a part of the surface of the secondary battery unit and has a heat conductivity higher than a heat conductivity of the case.

17 Claims, 5 Drawing Sheets

BATTERY PACK AND PORTABLE ELECTRONIC APPLIANCE

CROSS-REFERENCE TO RELATED APPLICATIONS

This application is based upon and claims the benefit of priority from the prior Japanese Patent Application No. 2000-301303, filed Sep. 29, 2000, the entire contents of which are incorporated herein by reference.

BACKGROUND OF THE INVENTION

1. Field of the Invention

The present invention relates to a battery pack and a portable electronic appliance, particularly, to a battery pack with an improved cycle life and a portable electronic appliance having the battery pack used therein.

2. Description of the Related Art

In recent years, the miniaturization and the reduction of weight of a portable electronic appliance has been drastically promoted in accordance with the technical innovation achieved in the field of the electronics. In this connection, an improvement in the energy density is required in respect of the battery providing the driving power source of the electronic appliance. A nonaqueous electrolyte secondary battery such as a lithium ion secondary battery has a high energy density and, thus, is widely used nowadays as a power source of many portable appliances.

The nonaqueous electrolyte secondary battery developed in the initial stage was mainly a cylindrical nonaqueous electrolyte secondary battery having an electrode group and a nonaqueous electrolyte housed in a cylindrical container having a circular cross section and made of a metal, said electrode group being formed by spirally winging a laminate structure comprising a sheet-like positive electrode, a sheet-like negative electrode and a sheet-like separator interposed between the positive electrode and the negative electrode. Then, the cylindrical container having a circular cross section was changed into a cylindrical container having a rectangular cross section so as to provide a nonaqueous electrolyte secondary battery having a rectangular cross section, which was superior in the volume efficiency to the cylindrical secondary battery having a circular cross section. Further, in recent years, a nonaqueous electrolyte secondary battery, which permits further decreasing the thickness and the weight, has been put to a practical use by using a case consisting essentially of a film material such as a laminate film.

The thickness and the weight of a portable electronic appliance can be decreased by using a nonaqueous electrolyte secondary battery comprising a case consisting essentially of a film material as a power source of the portable electronic appliance. Also, the nonaqueous electrolyte secondary battery of this type exhibits a good heat dissipation efficiency and is advantageous over the conventional cylindrical nonaqueous electrolyte secondary battery in safety. Stated reversely, however, the nonaqueous electrolyte secondary battery of this type is likely to be affected by the ambient temperature and is poor in the cycle characteristics at about 45 to 50° C., giving rise to the problem described below when mounted to a portable electronic appliance.

Specifically, parts that tend to generate heat such as a CPU of an electronic computer, a back light of a liquid crystal display device and a booster circuit are incorporated in the portable electronic appliance. As a result, if a battery assembly comprising a plurality of batteries of the nonaqueous electrolyte secondary battery are mounted to such a portable electronic appliance, only one of the secondary batteries, which is positioned adjacent to the heat generating part, is selectively heated so as to generate a large difference in temperature among the batteries of the battery assembly. It follows that a difference in voltage among the batteries of the battery assembly is increased, with the result that a heavy load is applied to one of the batteries of the battery assembly so as to markedly lower the battery characteristics, particularly, the cycle life. What should also be noted is that, when a single battery of a large capacity is mounted to the portable electronic appliance, a part of the battery is heated by the heat generating part, giving rise to inclination in the temperature distribution within the battery. In this case, a charge and discharge reaction is likely to take place non-uniformly so as to markedly lower the cycle life of the battery.

BRIEF SUMMARY OF THE INVENTION

An object of the present invention is to provide a battery pack with an improved cycle life and a portable electronic appliance having the battery pack used therein.

Another object of the present invention is to provide a battery pack capable of suppressing the diffusion of a leaking electrolyte to the outside and a portable electronic appliance having the battery pack used therein.

According to a first aspect of the present invention, there is provided a battery pack, comprising:
- a secondary battery unit including at least one secondary battery, the at least one secondary battery comprising an electrode group and an insulating case having the electrode group housed therein; and
- a heat conductive sheet provided at at least a part of the surface of the secondary battery unit and having a heat conductivity higher than a heat conductivity of the case.

According to a second aspect of the present invention, there is provided a portable electronic appliance using a secondary battery unit including at least one secondary battery, the at least one secondary battery comprising an electrode group and an insulating case having the electrode group housed therein, comprising:
- a battery housing section in which a secondary battery unit is arranged; and
- a heat conductive sheet arranged within the battery housing section and having a heat conductivity higher than a heat conductivity of the case.

According to a third aspect of the present invention, there is provided a portable electronic appliance, comprising:
- a secondary battery unit including at least one secondary battery, the at least one secondary battery comprising an electrode group and an insulating case having the electrode group housed therein; and
- a heat conductive sheet provided at at least a part of the surface of the secondary battery unit and having a heat conductivity higher than a heat conductivity of the case.

According to a fourth aspect of the present invention, there is provided a battery pack, comprising:
- a heat conductive sheet;
- a thermoplastic film arranged on the heat conductive sheet;
- an electrode group arranged on the thermoplastic film; and a film material thermally fused to the thermoplastic film in a manner to cover the electrode group so as to seal the electrode group.

According to a fifth aspect of the present invention, there is provided a portable electronic appliance, comprising:

a heat conductive sheet;

a thermoplastic film arranged on the heat conductive sheet;

an electrode group arranged on the thermoplastic film; and a film material thermally fused to the thermoplastic film in a manner to cover the electrode group so as to seal the electrode group.

According to a sixth aspect of the present invention, there is provided a battery pack, comprising:

a secondary battery unit including at least one secondary battery comprising an electrolyte; and an electrolyte absorbing sheet arranged on at least a part of the surface of the secondary battery unit.

According to a seventh aspect of the present invention, there is provided a portable electronic appliance using a secondary battery unit including at least one secondary battery comprising an electrolyte, comprising:

a battery housing section in which a secondary battery unit is arranged; and an electrolyte absorbing sheet arranged within the battery housing section.

Further, according to an eighth aspect of the present invention, there is provided a portable electronic appliance, comprising:

a secondary battery unit including at least one secondary battery comprising an electrolyte; and an electrolyte absorbing sheet arranged on at least a part of the surface of the secondary battery unit.

DETAILED DESCRIPTION OF THE INVENTION

The present invention is directed to a battery pack comprising a secondary battery unit including at least one secondary battery and to a portable electronic appliance in which is used the particular battery pack. The portable electronic appliance provided by the present invention includes, for example, a notebook type electronic computer, a portable telephone and a personal digital assistant (PDA).

The battery pack according to a first embodiment of the present invention comprises a secondary battery unit, and a heat conductive sheet provided at at least a part of the surface of the secondary battery unit to transmit and receive a heat to and from the secondary battery unit. The secondary battery unit includes at least one secondary battery comprising an insulating case. The heat conductive sheet has a heat conductivity higher than a heat conductivity of the case.

The present invention also provides a portable electronic appliance in which is used a secondary battery unit including at least one secondary battery comprising an insulating case. The portable electronic appliance comprises a battery housing section in which is arranged the secondary battery unit, and a heat conductive sheet arranged within the battery housing section in a manner to transmit and receive a heat to and from the secondary battery unit, and having a heat conductivity higher than a heat conductivity of the case.

In the battery pack according to the first embodiment of the present invention, the secondary battery unit is partially heated when heat is generated from parts within the electronic appliance. However, since the heat is transmitted to various parts of the secondary battery unit via the heat conductive sheet, the temperature distribution within the secondary battery unit can be made uniform. Also, the heat conductive sheet permits promoting the heat dissipation from the secondary battery unit. As a result, it is possible to improve the discharge capacity and the cycle life of the battery pack.

It is possible to arrange the heat conductive sheet on at least a part of the surface of the secondary battery unit. Also, it is possible to interpose another member between the heat conductive sheet and the secondary battery unit, if heat transmission can be performed between the heat conductive sheet and the secondary battery unit. The "another member" noted above includes, for example, an electrolyte absorbing sheet referred to herein later. If an electrolyte absorbing sheet is arranged between the heat conductive sheet and the secondary battery unit, it is possible to improve the life of the battery pack. It is also possible to suppress the diffusion of the electrolyte leaking from within the secondary battery to the outside of the battery pack.

An example of the battery pack of this type comprises a secondary battery unit, and a heat conductive sheet located on at least a part of the surface of the secondary battery unit.

The secondary battery unit includes at least one secondary battery comprising an electrode group and an insulating case housing the electrode group. The heat conductive sheet has a heat conductivity higher than a heat conductivity of the case.

Where the secondary battery unit comprises a single secondary battery and the heat conductive sheet is arranged on a part of the surface of the secondary battery unit, it is desirable for the heat conductive sheet to be arranged to face the electrode group of the secondary battery with the case interposed therebetween.

On the other hand, where the secondary battery unit comprises a plurality of secondary batteries and the heat conductive sheet is arranged on a part of the surface of the secondary battery unit, it is desirable for the heat conductive sheet to be arranged to bridge the plural secondary batteries and to face the electrode group of each of the plural secondary batteries with the case interposed therebetween. According to the battery pack of the particular construction, some of the plural secondary batteries are certainly heated when heat is generated from the part within the electronic appliance. However, since the generated heat is transmitted to each of the secondary batteries through the heat conductive sheet, it is possible to decrease the difference in temperature among the secondary batteries, with the result that it is possible to decrease the difference in voltage among the secondary batteries. Also, it is possible for the heat conductive sheet to promote the heat dissipation from the secondary battery. As a result, it is possible to improve the discharge capacity and the cycle life of the battery pack.

A battery pack 1 according to the first embodiment of the present invention will now be described with reference to FIGS. 1 to 3.

As shown in the drawings, the battery pack 1 comprises a secondary battery unit, a protective circuit 5, and a heat conductive sheet 6. The secondary battery unit comprising a battery assembly including three thin secondary batteries 2 connected in series. It is possible to use, for example, a thin nonaqueous electrolyte secondary battery as the thin secondary battery 2. The thin nonaqueous electrolyte secondary battery used in the present invention includes, for example, a thin lithium ion secondary battery, a thin lithium secondary battery and a thin lithium polymer secondary battery.

Figure 3:
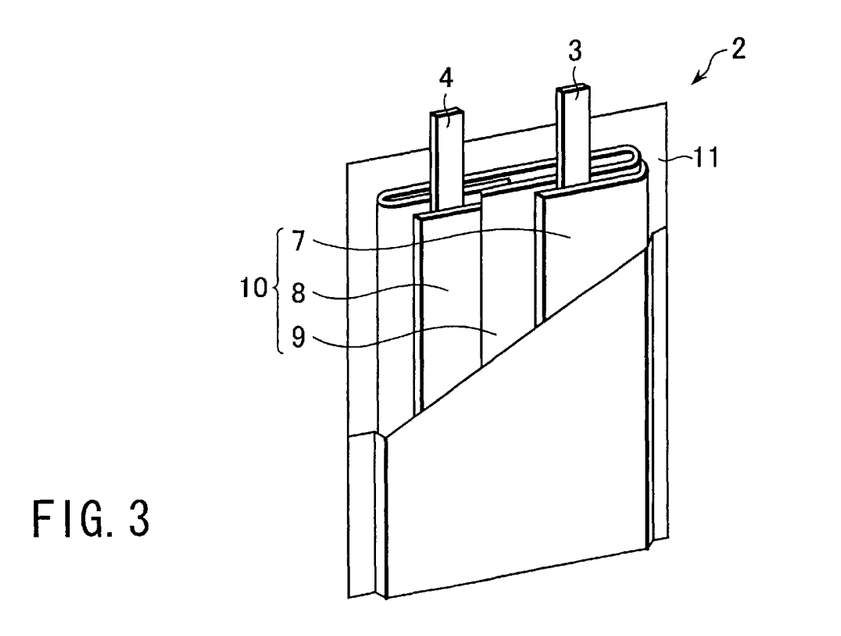
FIG. 3 is an oblique view, partly broken away, showing a thin nonaqueous electrolyte secondary battery incorporated in the battery pack shown in FIG. 1.

As shown in FIG. 3, the thin nonaqueous electrolyte secondary battery 2 comprises an electrode group 10 prepared by flatly winding a laminate structure comprising a positive electrode 7, a negative electrode 8 and a separator 9 interposed between the positive electrode 7 and the negative electrode 8, a nonaqueous electrolyte held by the electrode group 10, a positive electrode lead 3 connected to the positive electrode 7, a negative electrode lead 4 connected to the negative electrode 8, and a case 11 consisting essentially of a film material formed into a bag and housing the electrode group 10. The tip portions of the positive electrode lead 3 and the negative electrode lead 4 project to the outside of the case 11. The positive electrode lead 3 and the negative electrode lead 4 of each of the thin secondary battery are connected to the protective circuit 5. Further, the heat conductive sheet 6 is located on the surface of the secondary battery unit in a manner to bridge the three secondary batteries 10 and face the electrode group 2 of each of the secondary batteries 2 with the case 11 interposed therebetween.

The battery pack 1 of the particular construction is incorporated in a portable electronic appliance such that the secondary battery unit is positioned near the part that is likely to generate heat. In this case, some of the secondary batteries positioned adjacent to the heat generating portion are heated. However, since the heat is promptly transmitted to the other secondary batteries via the heat conductive sheet 6, it is possible to decrease the difference in temperature among the secondary batteries 2 so as to decrease the difference in voltage among the secondary batteries 2. It should also be noted that, since the heat dissipation to the outside of the electronic appliance is promoted by the arrangement of the heat conductive sheet 6, it is possible to suppress the temperature elevation of the battery assembly caused by the heating of the parts of the electronic assembly. It follows that it is possible to improve the discharge capacity and the cycle life of the battery assembly.

It should also be noted that, since the battery pack 1 of the particular construction is incorporated in a portable electronic appliance such that the heat conductive sheet 6 is positioned near the part that is likely to generate heat, the heat generated from the parts within the electronic appliance is transmitted to the secondary battery unit via the heat conductive sheet 6. As a result, the temperature distribution within the secondary battery unit tends to become uniform so as to decrease the difference in voltage among the secondary batteries 2. Also, the heat dissipation to the outside of the electronic appliance is promoted by the arrangement of the heat conductive sheet 6 so as to suppress the temperature elevation of the battery assembly caused by the heat generation from the parts of the electronic appliance. It follows that it is possible to improve the discharge capacity and the cycle life of the battery assembly.

The material having a heat conductivity higher than that of the case is used for forming the heat conductive sheet. The material having a heat conductivity higher than that of the case includes, for example, metals and various alloys such as aluminum, stainless steel, and copper; a ceramic material such as aluminum nitride; an expanded graphite sheet; a graphite sheet obtained by, for example, applying a heat treatment to a polymeric material sheet; and a plastic material or a rubber sheet having a powder of a heat conductive material such as a metal, carbon or a ceramic material added thereto. It is possible to form the heat conductive sheet by using a single or a plurality of materials. Particularly, it is desirable to use a material containing at least one of aluminum, copper and carbon as a main component. The particular material can be formed into a sheet easily. Also, the heat conductive sheet formed of the particular material is lightweight and rich in flexibility. Among the heat conductive sheet made of carbon, it is particularly desirable to use a carbon sheet obtained by, for example, applying a heat treatment to an organic film and a graphite sheet obtained by, for example, pressing a natural graphite. It is particularly desirable to use a heat conductive sheet consisting essentially of aluminum because the particular heat conductive sheet is capable of satisfying both the weight energy density and the heat conductivity.

It is desirable for the thickness of the heat conductive sheet to fall within a range of between 0.01 mm and 3 mm. In view of the reduction in the thickness and weight of the electronic appliance, it is desirable for the heat conductive sheet to be thin. Practically, it is desirable for the thickness of the heat conductive sheet to be not larger than 3 mm. However, if the thickness of the heat conductive sheet is smaller than 0.01 mm, the heat dissipation properties and the soaking properties of the heat conductive sheet are lowered, resulting in failure to make the temperature distribution of the secondary battery unit sufficiently uniform. It is more desirable for the thickness of the heat conductive sheet to fall within a range of between 0.1 mm and 1 mm.

Where the heat conductivity of the heat conductive sheet at 25° C. is at least 100 [W/mk], it is desirable for the thickness of the heat conductive sheet to meet formula (1) given below:

$$0.1 L/\rho \leq t \qquad (1)$$

where t denotes the thickness [mm] of the heat conductive sheet, L denotes the length [mm] of the diagonal of the secondary battery unit, and ρ denotes the heat conductivity [W/mk] of the heat conductive sheet at 25° C.

Figure 1:
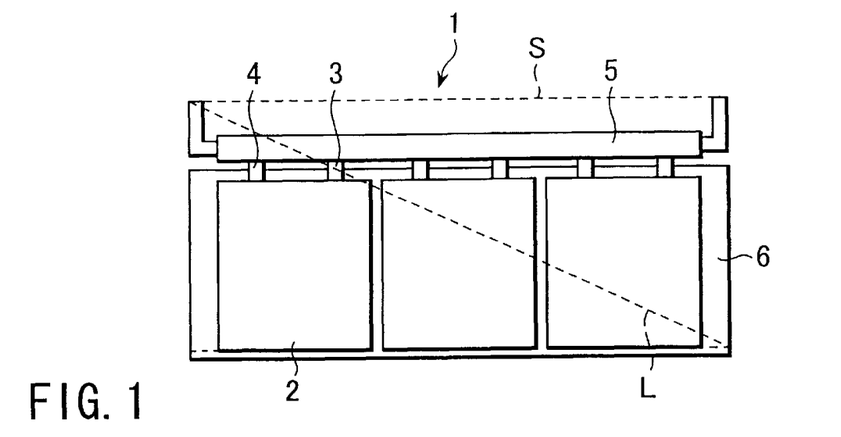
FIG. 1 schematically shows as an example the construction of a battery pack according to a first embodiment of the present invention.
Figure 2:
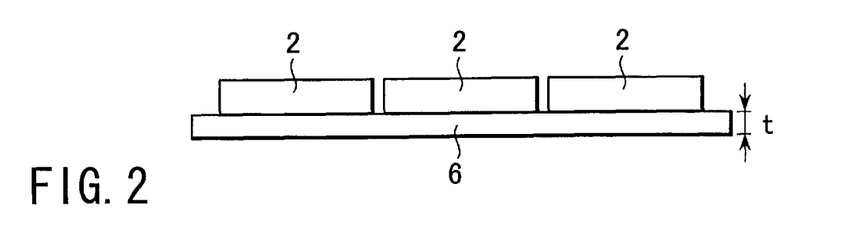
FIG. 2 is a side view of the battery pack shown in FIG. 1.

The thickness t of the heat conductive sheet 6 of the battery pack shown in FIG. 1 is shown in FIG. 2. Also, the length L shown in FIG. 1 of the diagonal in the smallest rectangle of the rectangles surrounding the entire secondary battery unit represents the length L [mm] of the diagonal of the secondary battery unit. On the other hand, it is desirable for the heat conductivity ρ to be as large as possible because the thickness t of the heat conductive sheet can be decreased if the heat conductivity ρ is large. It is desirable for the heat conductive sheet to contain a material selected from the group consisting of Al having a heat conductivity of 237 [W/mk] at 25° C., Cu having a heat conductivity of 400 [W/mk] at 25%, and graphite having a heat conductivity falling within a range of between 100 and 800 [W/mk] at 25° C.

Where the thickness t of the heat conductive sheet is not smaller than 0.1 L/ρ, the temperature distribution of the secondary battery unit can be made uniform promptly when the secondary battery unit is partially heated from the outside by, for example, the heat generated from the part within the electronic appliance so as to further improve the discharge capacity and the charge-discharge cycle life of the secondary battery unit. It follows that the driving time of the electronic appliance using the particular battery can be further prolonged.

The heat transmitting rate of the heat conductive sheet can be increased with increase in the thickness t of the heat conductive sheet. However, if the thickness t of the heat conductive sheet is excessively large, it is impossible to obtain a high volume energy density in the battery pack. Such being the situation, where the heat conductivity of the heat conductive sheet at 25° C. is not lower than 100 [W/mk], it is desirable for the thickness of the heat conductive sheet to satisfy formula (2) given below in order to improve the charge-discharge cycle life of the secondary battery unit while ensuring a high volume energy density:

$$0.1 L/\rho \leq t \leq L/\rho \qquad (2)$$

where t represents the thickness [mm] of the heat conductive sheet, L represents the length [mm] of the diagonal of the secondary battery unit, and p represents the heat conductivity [W/mk] of the heat conductive sheet at 25° C.

Sufficient soaking and heat dissipation in the battery assembly can be conducted by simply arranging the heat conductive sheet 6 directly on the battery assembly as shown in FIG. 1. However, it is desirable for the heat conductive sheet 6 to be fixed to the battery assembly by using an adhesive containing a powder of a heat transmitting material such as a metal, carbon or a ceramic material. Also, it is possible for a metal pack or a plastic pack housing the battery assembly to be arranged in contact with the heat conductive sheet. Further, it is desirable for the metal pack or the plastic pack noted above and the heat conductive sheet to be fixed to each other with an adhesive containing a powder of the heat conductive material noted above.

It is desirable to arrange the heat conductive sheet 6 over the entire surface having the largest area of the surfaces of the secondary battery 2 as shown in FIG. 1 because the temperature distribution of the secondary battery tends to be become uniform and the heat dissipation effect is increased in this case. However, it is possible for the heat conductive sheet 6 to cover only partly the surface having the largest area, if it is possible to obtain a sufficient soaking effect and a sufficient heat dissipation effect. Also, in the case of using a battery assembly as the secondary battery unit, it is desirable to arrange the heat conductive heat 6 in a manner to bridge the secondary batteries of the battery assembly as shown in FIG. 1. In the particular construction, it is possible to obtain a sufficient soaking effect and a sufficient heat dissipation effect, making it possible to further improve the discharge capacity and the cycle life of the battery assembly.

FIG. 3 shows that the electrode group used in the secondary battery is prepared by spirally winding in a flat shape a laminate structure comprising a positive electrode, a negative electrode and a separator interposed between the positive electrode and the negative electrode. Alternatively, it is also possible to use an electrode group having a laminate structure including a plurality of stacked sets of laminate structures each comprising a positive electrode, a negative electrode and a separator interposed between the positive electrode and the negative electrode.

Let us describe the positive electrode, the negative electrode, the separator, the nonaqueous electrolyte and the case included in the nonaqueous electrolyte secondary battery 2.

(1) Positive Electrode

The positive electrode can be prepared by coating a current collector such as an aluminum foil with a suspension prepared by suspending a positive electrode active material, a conducting agent and a binder in a suitable solvent, followed by drying and pressing the coated suspension.

The positive electrode active material is formed of various oxides and sulfides including, for example, manganese oxide ($MnO_2$), lithium manganese complex oxide (e.g., $LiMn_2O_4$ or $LiMnO_2$), lithium nickel complex oxide (e.g., $LiNiO_2$), lithium cobalt complex oxide (e.g., $LiCoO_2$), lithium nickel cobalt complex oxide (e.g., $LiNi_{1-x}CO_xO_2$), lithium manganese cobalt complex oxide (e.g., $LiMn_xCo_{1-x}O_2$), and vanadium oxide (e.g., $V_2O_5$). It is also possible to use an organic material such as a conductive polymer material or a disulfide series polymer material as the positive electrode active material. Among these positive electrode active materials, it is desirable to use lithium manganese complex oxide ($LiMn_2O_4$), lithium nickel complex oxide ($LiNiO_2$), lithium cobalt complex oxide ($LiCoO_2$), lithium nickel cobalt complex oxide ($LiNi_{0.8}Co_{0.2}O_2$), and lithium manganese cobalt complex oxide ($LiMn_xCo_{1-x}O_2$) each having a high battery voltage.

The conducting agent noted above includes, for example, acetylene black, carbon black and graphite.

Further, the binder used in the present invention includes, for example, polytetrafluoro-ethylene (PTFE), polyvinylidene fluoride (PVdF) and a fluorine-based rubber.

It is desirable for the mixing amount of the positive electrode active material to fall within a range of between 80 and 95% by weight, for the mixing amount of the conducting agent to fall within a range of between 3 and 20% by weight, and for the mixing amount of the binder to fall within a range of between 2 and 7% by weight.

(2) Separator

The separator used in the present invention is formed of, for example, an unwoven fabric of a synthetic resin, a polyethylene porous film or a polypropylene porous film.

(3) Negative Electrode

The negative electrode is prepared by, for example, coating a metal foil such as a copper foil with a suspension prepared by suspending a negative electrode active material, a conducting agent and a binder in a suitable solvent, followed by drying and pressing the coated suspension.

The negative electrode active material used in the present invention includes, for example, lithium metal, a lithium alloy (e.g., $Li_4Ti_5O_{12}$), a metal oxide (e.g., amorphous tin oxide, $WO_2$ and $MoO_2$), $TiS_2$, and a carbonaceous material absorbing and desorbing lithium ions. Particularly, it is desirable to use a carbonaceous material as the negative electrode active material. The negative electrode containing the carbonaceous material permits improving the charge-discharge efficiency of the negative electrode and also permits decreasing the negative electrode resistance accompanying the charge-discharge operation, with the result that it is possible to markedly improve the cycle life and the output characteristics of the nonaqueous electrolyte secondary battery.

The carbonaceous material used in the present invention includes, for example, graphite, an isotropic graphite, coke, a carbon fiber, a spherical carbon, a resin-burned carbon and a vapor-grown-carbon. Particularly, it is desirable to use as the carbonaceous material the mesophase pitch based carbon fiber or the mesophase pitch based spherical carbon because the negative electrode containing the particular carbon fiber or the spherical carbon noted above exhibits a high charging efficiency and, thus, permits improving the cycle life. Also, it is desirable for the mesophase pitch based carbon fiber and the mesophase pitch based spherical carbon to have a radial orientation in graphite crystallites. The carbon fiber based on the mesophase pitch and the spherical carbon based on the mesophase pitch can be prepared by applying a heat treatment to the raw material such as the petroleum pitch, coal tar or resin under 550 to 2,000° C. for carbonization of the raw material or by applying a heat treatment to the raw material at 2,000° C. or higher for graphitization of the raw material.

It is desirable for the carbonaceous material to have an interplanar spacing $d_{002}$ derived from (002) reflection obtained from the X-ray diffraction falling within a range of between 0.3354 m and 0.4 nm. It is also desirable for the carbonaceous material to have a specific surface area not smaller than 0.5 $m^2/g$ as determined by a BET method. It is more desirable for the specific surface area to be not smaller than 1 $m^2/g$.

The binder used in the present invention includes, for example, polytetrafluoroethylene (PTFE), polyvinylidene fluoride (PVdF), ethylene-propylene-diene copolymer, styrene-butadiene rubber (SBR), and carboxymethyl cellulose (CMC).

(4) Nonaqueous Electrolyte

The nonaqueous electrolyte used in the present invention includes, for example, a liquid nonaqueous electrolyte prepared by dissolving a solute in a nonaqueous solvent, a gel nonaqueous electrolyte prepared by compounding a polymer, a nonaqueous solvent and a solute, a solid nonaqueous electrolyte in which a solute is held by a polymer, and an inorganic solid electrolyte exhibiting a lithium ion conductivity. Particularly, it is desirable to use the liquid nonaqueous electrolyte in view of the various properties exhibited by the liquid nonaqueous electrolyte.

A known nonaqueous solvent can be used in the present invention, and it is desirable to use a cyclic carbonate such as ethylene carbonate (EC) or propylene carbonate (PC) and a nonaqueous solvent containing as a main component a mixed solvent containing the cyclic carbonate and a non-aqueous solvent (second solvent) having a viscosity lower than that of the cyclic carbonate.

The second solvent noted above includes, for example, chain-like carbonates such as dimethyl carbonate, methyl ethyl carbonate, and diethyl carbonate; γ-butyrolactone; acetonitrile; methyl propionate; ethyl propionate; cyclic ethers such as tetrahydrofuran and 2-methyl tetrahydrofuran; and chain-like ethers such as dimethoxy ethane and diethoxy ethane.

The solute used in the present invention includes alkali salts. Particularly, it is desirable to use lithium salt as the solute. The lithium salt used in the present invention includes, for example, lithium hexafluoro phosphate ($LiPF_6$), lithium borofluoride ($LiBF_4$), lithium hexafluoro arsenate ($LiAsF_6$), lithium perchlorate ($LiClO_4$), and lithium trifluoro meta-sulfonate ($LiCF_3SO_3$). Particularly, it is desirable to use lithium hexafluoro phosphate ($LiPF_6$) and lithium borofluoride ($LiBF_4$) as the lithium salt providing the solute in the present invention.

It is desirable for the amount of the solute dissolved in the nonaqueous solvent to fall within a range of between 0.5 and 2 mol/L.

(5) Case

The film material forming the case includes, for example, a laminate film.

It is desirable for the laminate film to include a thermoplastic resin layer and a metal layer. The thermoplastic resin noted above includes, for example, an ionomer and polyethylene. On the other hand, it is desirable for the metal layer to contain aluminum. Particularly, it is desirable for the laminate film to include a thermoplastic resin layer arranged on the heat seal surface and a metal thin film such as an aluminum thin film arranged in the intermediate region. To be more specific, it is possible to use a laminate film of a polyethylene (PE)/polyethylene terephthalate (PET)/Al foil/PET structure laminated such that the PE film constitutes a heat seal surface, a laminate film of a PE/nylon/Al foil/PET structure laminated such that the PE film constitutes a heat seal surface, a laminate film of an ionomer/Ni foil/PE/PET structure laminated such that the ionomer film constitutes a heat seal surface, a laminate film of an ethylene vinyl acetate (EVA)/PE/Al foil/PET structure laminated such that the EVA film constitutes a heat seal surface, and a laminate film of an ionomer/PET/Al foil/PET structure laminated such that the ionomer film constitutes a heat seal surface. The films other than the PE film, the ionomer film and the EVA film constituting the heat seal surface serve to produce the resistance to the air permeability and the resistance to chemicals.

It is also possible to use a laminate film including an organic resin film and an Al film and laminated in the order of an organic resin film/Al film/organic resin film. It is desirable for the thickness of the laminate film to fall within a range of between 90 μm and 115 μm.

The organic resin film forming the outer surfaces of the case includes, for example, a film containing PET (biaxially oriented polyester) and a film containing ONy (biaxially oriented nylon). It is desirable for the thickness of the organic resin film to fall within a range of between 15 μm and 30 μm.

It is desirable for the thickness of the Al film to fall within a range of between 20 μm and 40 μm.

On the other hand, the organic resin film forming the inner surface of the case includes, for example, a film containing polyolefin such as PP (polypropylene) and PE (polyethylene). It is desirable for the particular organic film to exhibit a corrosion resistance in respect of hydrofluoric acid.

It is desirable for the thickness of the film material to fall within a range of between 0.01 mm and 0.5 mm. If the thickness of the film material is smaller than 0.01 mm, the strength of the case tends to be rendered insufficient. On the other hand, the thickness of the film material exceeding 0.5 mm is undesirable in view of the reduction in the thickness and weight of the secondary battery. It is more desirable for the thickness of the film material to fall within a range of between 0.05 mm and 0.2 mm.

It is desirable for the thickness of the secondary battery to fall within a range of between 0.1 mm and 5 mm. If the thickness of the secondary battery is less than 0.1 mm, the strength of the secondary battery tends to be rendered insufficient. On the other hand, if the thickness of the secondary battery exceeds 5 mm, the volume energy density of the secondary battery tends to be rendered low. It is more desirable for the thickness of the secondary battery to fall within a range of between 1 mm and 4.5 mm.

A battery pack according to a second embodiment of the present invention comprises a heat conductive sheet, an electrode group located on the heat conductive sheet with a thermoplastic film interposed therebetween, and a film material covering the electrode group on the thermoplastic film and thermally fused to the thermoplastic film so as to seal the electrode group.

A portable electronic appliance according to a second embodiment of the present invention comprises the battery pack according to the second embodiment of the present invention noted above.

When heat is generated from the part inside the electronic appliance, the secondary battery is partially heated. In the battery pack according to the second embodiment of the present invention, however, the heat is transmitted to the various parts of the secondary battery via the heat conductive sheet, with the result that the temperature distribution of the secondary battery is rendered uniform. Also, the heat conductive sheet serves to promote the heat dissipation from the secondary battery. It follows that it is possible to improve the discharge capacity and the cycle life of the battery pack.

Figure 4:
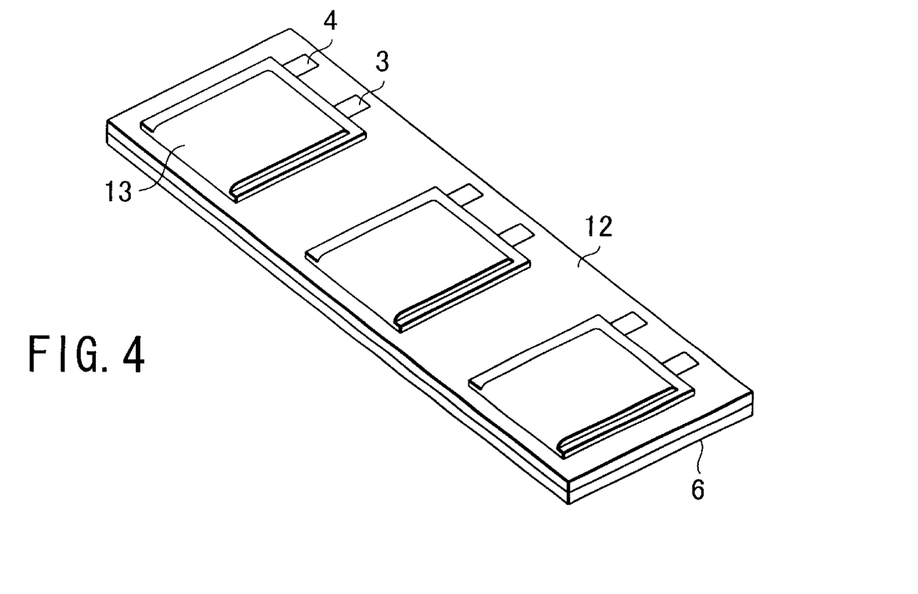
FIG. 4 schematically shows as an example the construction of a battery pack according to a second embodiment of the present invention.
Figure 5:
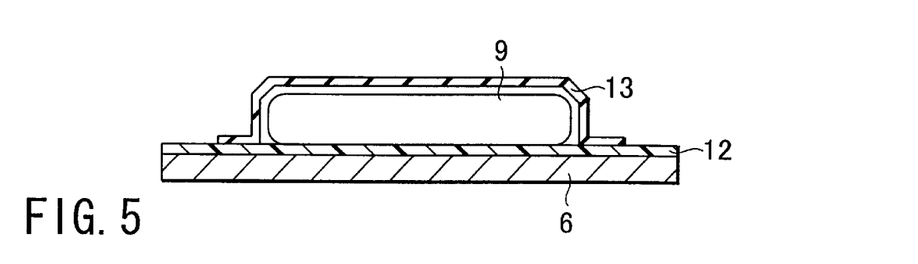
FIG. 5 is a cross sectional view showing a part of the battery pack shown in FIG. 4.

An example of the battery pack according to the second embodiment of the present invention is shown in FIGS. 4 and 5. The members of the battery pack common with those shown in FIG. 1 are denoted by the same reference numerals so as to avoid an overlapping description.

As shown in the drawings, the surface of the heat conductive film 6 is covered with the thermoplastic film 12. Each of three flat type electrode groups 9 is arranged on the thermoplastic film 12. The film material 13 is arranged on the surface of the thermoplastic film 12 in a manner to cover the electrode group 9. The film material 12 is heat-sealed to the surface of the thermoplastic film 12 so as to permit the electrode group 9 to be housed in the hermetic free space defined between the film material 13 and the thermoplastic film 12. The positive electrode lead 3 and the negative electrode lead 4 extend to the outside of the film material 13. Three thin type nonaqueous electrolyte secondary batteries each constructed such that the electrode group 9 is sealed by the film material 13 and the heat conductive sheet 6 are connected in series, and the positive electrode lead 3 and the negative electrode lead 4 of each secondary battery are connected to a protected circuit (not shown).

The thermoplastic film can be formed of, for example, at least one kind of polyolefin selected from the group consisting of, for example, polyethylene and polypropylene.

When heat is generated from the part within the electronic appliance, a part of the secondary battery is excessively heated. However, where the battery pack according to the second embodiment of the present invention is incorporated in the portable electronic appliance such that the film material 13 is positioned near the part that easily generates heat, the generated heat is transmitted to the other secondary batteries via the heat conductive sheet so as to decrease the difference in temperature among the secondary batteries and to decrease the difference in voltage among the secondary batteries. Also, since the heat conductive sheet 6 promotes the heat dissipation to the outside of the electronic appliance, it is possible to suppress the temperature elevation of the battery pack caused by the heat generation from the part of the electronic appliance. It follows that it is possible to improve the discharge capacity and the cycle life of the battery pack.

It should also be noted that, where the battery pack according to the second embodiment of the present invention is incorporated in the portable electronic appliance such that the heat conductive sheet 6 is positioned near that part of the electronic appliance which easily generates heat, the heat generated from the particular part is transmitted to each secondary battery through the heat conductive sheet 6 so as to decrease the difference in temperature among the secondary batteries and to decrease the difference in voltage among the secondary batteries. Also, the heat conductive sheet 6 promotes the heat dissipation to the outside of the electronic appliance so as to suppress the temperature elevation of the battery pack caused by the heat generated from the part of the electronic appliance. It follows that it is possible to improve the discharge capacity and the cycle life of the battery pack.

Incidentally, three electrode groups 9 are arranged in the embodiment shown in FIGS. 4 and 5. However, the number of electrode groups 9 is not particularly limited. It is possible to arrange one, two or more than three electrode groups 9. Also, in the embodiment shown in FIGS. 4 and 5, the electrode groups 9 are individually covered with the film materials. Alternatively, it is also possible to have the three electrode groups 9 covered with a single film material.

A battery pack according to a third embodiment of the present invention comprises a secondary battery unit including at least one secondary battery comprising an electrolyte, and an electrolyte absorbing sheet arranged to cover at least a part of the surface of the secondary battery unit and capable of absorbing the electrolyte.

A portable electronic appliance according to a third embodiment of the present invention is a portable electronic appliance using a secondary battery unit including at least one secondary battery comprising an electrolyte. The particular portable electronic appliance comprises a battery housing section in which the secondary battery unit is located and an electrolyte absorbing sheet located within the battery housing section in contact with the secondary battery unit.

Among the secondary batteries, the secondary battery equipped with a case consisting essentially of a film material is inferior in the mechanical strength to the secondary battery equipped with a metal can used as a case. Particularly, the secondary battery equipped with a case made of a film material is weak against the external force such as a sticking force produced by a part having a sharp edge portion. To be more specific, the case made of the film material tends to be broken when subjected to such an external force as noted above so as to bring about leakage of the electrolyte from within the secondary battery. If such a phenomenon takes place within the electronic appliance provided with a bare metal wiring, it is possible to bring about a heat generation and ignition accident. In other words, when it comes to an electronic appliance provided with a secondary battery comprising a case consisting essentially of a film material, the lowered safety caused by the electrolyte leakage constitutes a serious problem to be solved.

The battery pack according to the third embodiment of the present invention is effective for solving the problem accompanying the electrolyte leakage from within the secondary battery. Specifically, the leaking electrolyte can be absorbed by the electrolyte absorbing sheet so as to make it possible to prevent the electrolyte from being attached to the electronic part within the electronic appliance. It follows that it is possible to prevent the corrosion of the electronic part as well as the heat generation and ignition of the electronic appliance caused by the electrolyte.

In the battery pack according to the third embodiment of the present invention, it is desirable for the electrolyte absorbing sheet to be flame retardant. Where the electrolyte absorbing sheet is flame retardant, it is possible to eliminate the danger that the sheet holding the leaking electrolyte is ignited by, for example, the short-circuit within the secondary battery or the spark generated within the electronic appliance.

Figure 6:
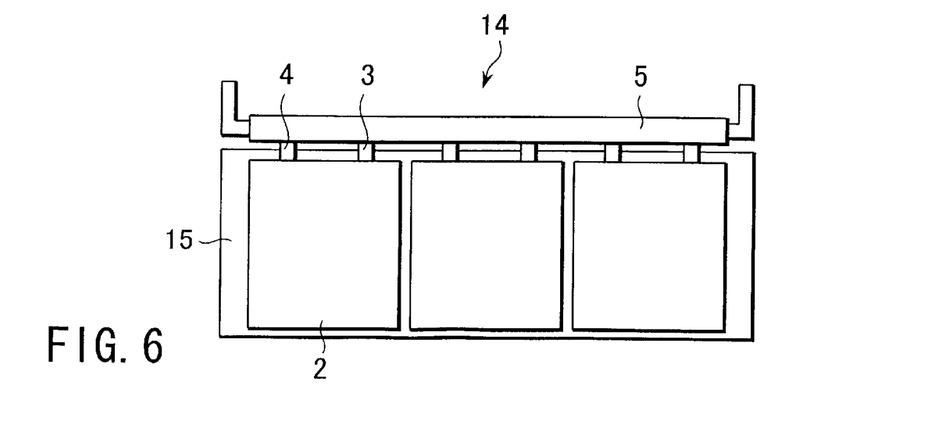
FIG. 6 schematically shows as an example the construction of a battery pack according to a third embodiment of the present invention.

FIG. 6 shows the construction of an example of a battery pack 14 according to the third embodiment of the present invention. The members of the battery pack common with those of the battery pack shown in FIG. 1 are denoted by the same reference numerals so as to avoid an overlapping description.

As shown in FIG. 6, the battery pack 14 comprises a secondary battery unit, the protective circuit 5 and a sheet 15 capable of absorbing the electrolyte. The secondary battery unit comprises a battery assembly including three thin type secondary batteries 2 connected in series. It is possible to use, for example, a thin type nonaqueous electrolyte secondary battery equipped with a liquid nonaqueous electrolyte as the thin type secondary battery 2. The positive electrode lead 3 and the negative electrode lead 4 of each of the thin type secondary batteries 2 are connected to the protective circuit 5. The electrolyte absorbing sheet 15 is arranged on the surface of the secondary battery unit in a manner to bridge the three secondary batteries 2 and to face the electrode group 10 of each of the secondary batteries with the case 11 interposed therebetween.

The battery pack according to the third embodiment of the present invention is effective for preventing the problems accompanying the nonaqueous electrolyte leakage from within the secondary battery 2 caused by, for example, the breakage of the film material 11 of the secondary battery 2 because of the sticking of a part having sharp edge portion into the film material 11 of the secondary battery 2. To be more specific, the nonaqueous electrolyte leaking from within the secondary battery 2 is absorbed by the electrolyte absorbing sheet 15 so as to prevent the nonaqueous electrolyte from being diffused into the electronic circuit, etc. within the electronic appliance. As a result, it is possible to avoid the occurrence of the heat generation and the ignition within the electronic appliance. Also, by selecting a suitable material, it is possible to enable the battery pack to perform the function of self-repairing of the leaking portion of the electrolyte.

Since the electrolyte absorbing sheet is intended to prevent the leaking electrolyte from being diffused into the electronic appliance when the electrolyte leaks from the battery, the material of the sheet is not particularly limited as far as the sheet is capable of sufficiently absorbing the leaking electrolyte and maintaining its shape. For example, it is possible for the electrolyte absorbing sheet to be formed of paper, unwoven fabric or various liquid absorbing polymeric material. It is desirable for the liquid absorbing polymeric material to be a polymeric material having a positive or zero osmotic pressure relative to the electrolyte. Particularly, it is desirable to use a polymeric material that has a high liquid absorption capability and that can be easily processed into a thin sheet. For example, it is desirable to use a homopolymer or a copolymer of carbonate and olefinic hydrocarbon or a mixture thereof as the polymeric material forming the electrolyte absorbing sheet. To be more specific, the polymeric material used forming the electrolyte absorbing sheet in the present invention includes, for example, polycarbonate, polyethyl acrylate, polymethyl methacrylate, polyethylene oxide, polypropylene oxide and a copolymer containing these monomer units. Incidentally, one or a plurality of different kinds of materials can be used for forming the electrolyte absorbing sheet.

The type of the electrolyte absorbing sheet is not particularly limited, though it is desirable for the electrolyte absorbing sheet to be thin, lightweight and rich in flexibility in view of the reduction of the thickness and the weight of the portable electronic appliance. Further, it is desirable for the electrolyte absorbing sheet to be formed of, for example, an unwoven fabric of a polymeric fiber in view of the productivity because the unwoven fabric permits easily manufacturing the electrolyte absorbing sheet.

The thickness of the electrolyte absorbing sheet is not particularly limited, though it is desirable for the thickness to fall within a range of between 0.01 mm and 3 mm. If the electrolyte absorbing sheet is thinner than 0.01 mm, the leaking electrolyte tends to be diffused within the electronic appliance. On the other hand, the electrolyte absorbing sheet thicker than 3 mm is not desirable in view of the reduction in the thickness and weight of the portable electronic appliance. It is more desirable for the thickness of the electrolyte absorbing sheet to fall within a range of between 0.05 mm and 0.5 mm.

In view of the safety of the battery, it is desirable for the electrolyte absorbing sheet to contain a flame retardant polymeric material. The flame retardant material used in the present invention is not particularly limited. For example, it is possible to use known flame retardant materials such as a copolymer of a flame retardant polymeric material like a modacrylic fiber and a mixture having a flame-retardant added to a polymeric material. Of course, these materials can be used in the form of a mixture.

In order to increase the recovery rate of the leaking electrolyte, it is desirable to arrange the electrolyte absorbing sheet 15 on the surface having the largest area of the surfaces of the secondary battery as shown in FIG. 6, though it is possible to arrange the electrolyte absorbing sheet 15 in a manner to cover a part of the surface having the largest area of the secondary battery if it is possible to obtain a sufficiently high electrolyte recovery rate. Also, in the case of using a battery assembly as the secondary battery unit, it is desirable to arrange the electrolyte absorbing sheet 15 in a manner to bridge all the secondary batteries of the battery assembly, as shown in FIG. 6.

Also, if a polymeric material capable of reaction with the electrolyte so as to be solidified is contained in the electrolyte absorbing sheet, the broken laminate sheet in the electrolyte leaking portion can be self-repaired.

In the battery pack according to the third embodiment of the present invention, it is possible to arrange the heat conductive sheet 6 on the side of that surface of the electrolyte absorbing sheet 15 to which the secondary battery unit is not fixed or to use the electrolyte absorbing sheet 15 having a heat conductivity. In this construction, it is possible to allow the electrolyte absorbing sheet 15 to recover the electrolyte leaking from within the secondary battery unit and to realize the soaking of the secondary battery unit and heat dissipating from the secondary battery unit. Incidentally, it is possible to fix the electrolyte absorbing sheet 15 and the heat conductive sheet 6 with, for example, an adhesive.

In the embodiments shown in FIGS. 1 to 6, thin type nonaqueous electrolyte secondary batteries are incorporated as the secondary batteries in the battery packs according to the first to third embodiments of the present invention. However, various kinds of secondary batteries can be incorporated in the battery packs according to the first to third embodiments of the present invention. For example, it is possible to incorporate a lead storage battery, a silver oxide-zinc storage battery, nickel-cadmium battery or a nickel-hydrogen battery in the battery pack of the present invention, though the battery incorporated in the battery packs of the present invention are not limited to those exemplified above. In order to decrease the weight of the portable electronic appliance, it is desirable to use a battery having a high energy density and, thus, to use a nonaqueous electrolyte secondary battery. Particularly, in view of the reduction in the thickness and weight of the portable electronic appliance, it is desirable to use a thin type nonaqueous electrolyte secondary battery comprising a case consisting essentially of a film material. Further, in view of the battery characteristics such as the low temperature characteristics and the load characteristics, it is desirable to use a thin type lithium secondary battery comprising a liquid nonaqueous electrolyte.

An example of the portable electronic appliance, i.e., a notebook type electronic computer 16, to which is mounted the battery pack according to any of the first to third embodiments of the present invention will now be described with reference to FIGS. 7 to 9.

As shown in the drawings, the notebook type electronic computer 16, which is an example of a portable electronic appliance, comprises a first main body (upper casing) 18 equipped with a display device 17, a second main body (lower casing) 20 equipped with a key board input device, and a hinge section 21 for joining the first main body 18 and the second main body 20. As shown in FIG. 8, the first main body 18 comprises the display device 17, a sheet 22 having a heat conductivity or capable of absorbing the electrolyte, which is arranged behind the display device 17, a secondary battery unit 23 acting as a driving source positioned adjacent to the sheet 22, and a case 24 positioned adjacent to the secondary battery unit 23. It is possible to use, for example, a liquid crystal display device (LCD) as the display device 17. The liquid crystal display device (LCD) is equipped with a back light and a circuit substrate such as a booster circuit in addition to a liquid crystal cell. The secondary battery unit 23 comprises a battery assembly obtained by connecting in parallel two sets of battery assembly units each prepared by connecting in series three thin type nonaqueous electrolyte secondary batteries 2. The diagonal of the secondary battery unit 23 is denoted by L. The positive electrode lead 3 and the negative electrode lead 4 of each of these secondary batteries are connected to the protective circuit 5. Also, the second main body 20 is equipped with a main circuit section (CPU) (not shown), a DC-AC converter (not shown), a hard disk driver (not shown), a PC card slot (not shown), etc. in addition to the key board input device 19.

It should be noted that the heat conductive sheet 22 is arranged between the display device 17 and the secondary battery unit 23 in the portable electronic appliance of the construction described above. The heat conductive sheet 22 serves to suppress the excessive heating of a part of the secondary battery unit 23 caused by the heat generated from the back light or the circuit substrate and to release the excessive heat to the outside of the electronic appliance.

It should also be noted that, since the sheet 22 capable of absorbing the electrolyte is arranged between the display device 17 and the secondary battery unit 23, the leaking electrolyte can be promptly absorbed by the electrolyte absorbing sheet 22 when the film material of the case 11 of the secondary battery 2 is broken so as to cause the electrolyte leakage. It follows that the diffusion of the leaking electrolyte into the electronic appliance can be suppressed. As a result, it is possible to avoid the occurrence of the heat generation and ignition reaction within the portable electronic appliance.

Figure 7:
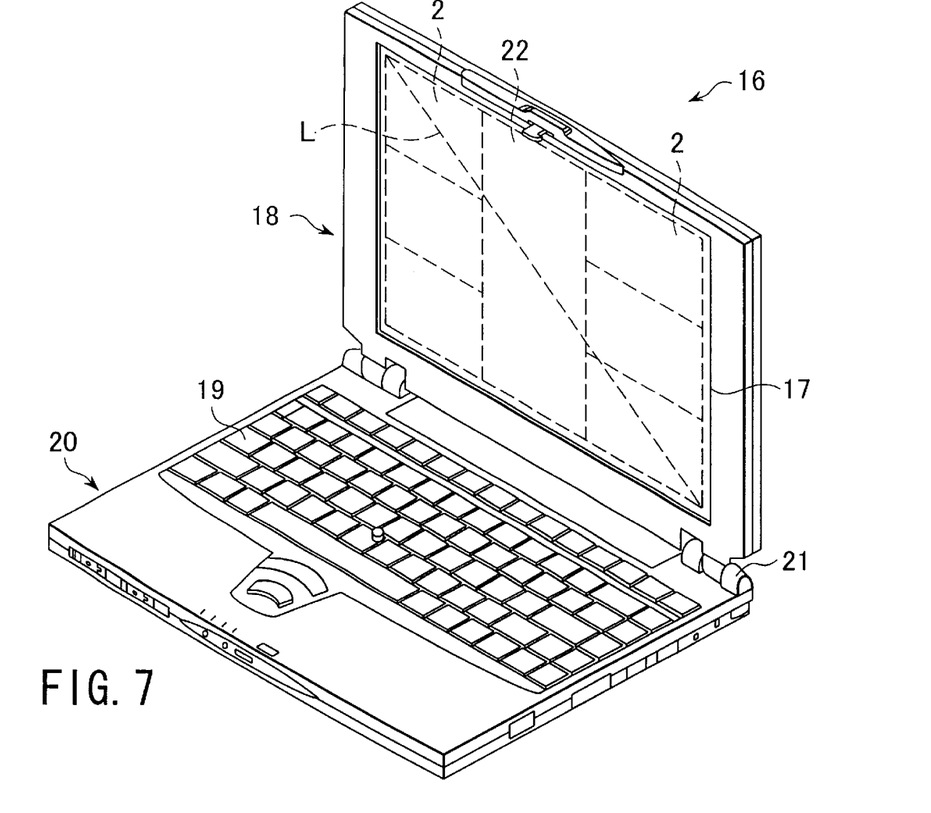
FIG. 7 schematically shows a notebook type electronic computer as an example of a portable electronic appliance of the present invention.
Figure 8:
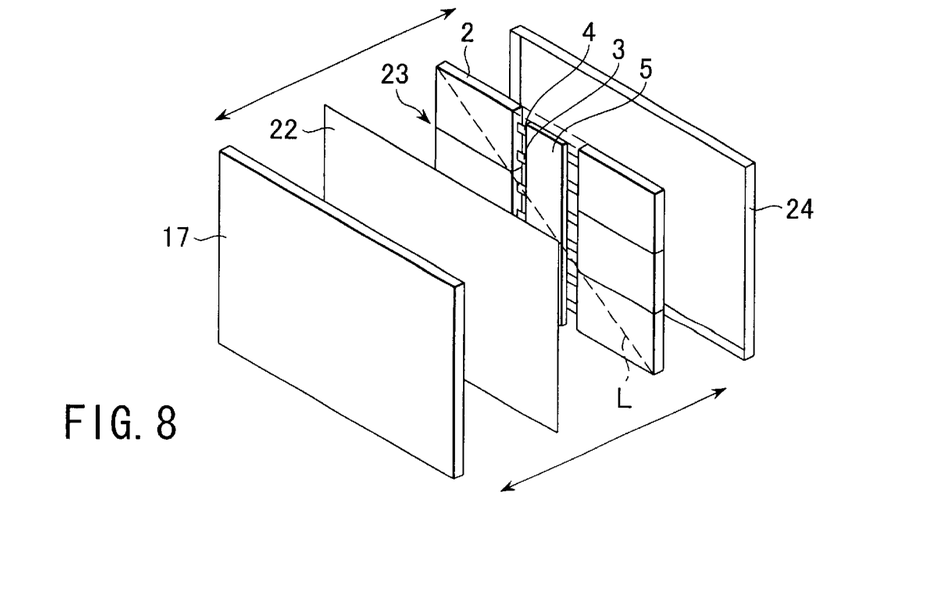
FIG. 8 schematically shows the positional relationship between the display device and the battery pack in the first body shown in FIG. 7.

Incidentally, in the embodiment shown in FIGS. 7 and 8, the sheet 22 having a heat conductivity or capable of absorbing the electrolyte is arranged between the display device 17 and the secondary battery unit 23. Alternatively, it is also possible to arrange the sheet 22 having a heat conductivity or capable of absorbing the electrolyte inside the case 24.

Also, in the embodiment shown in FIGS. 7 and 8, six secondary batteries are arranged in the secondary battery unit 23. However, the number of secondary batteries are not particularly limited. For example, it is possible to arrange three secondary batteries in the secondary battery unit 23 as shown in FIG. 9.

Figure 9:
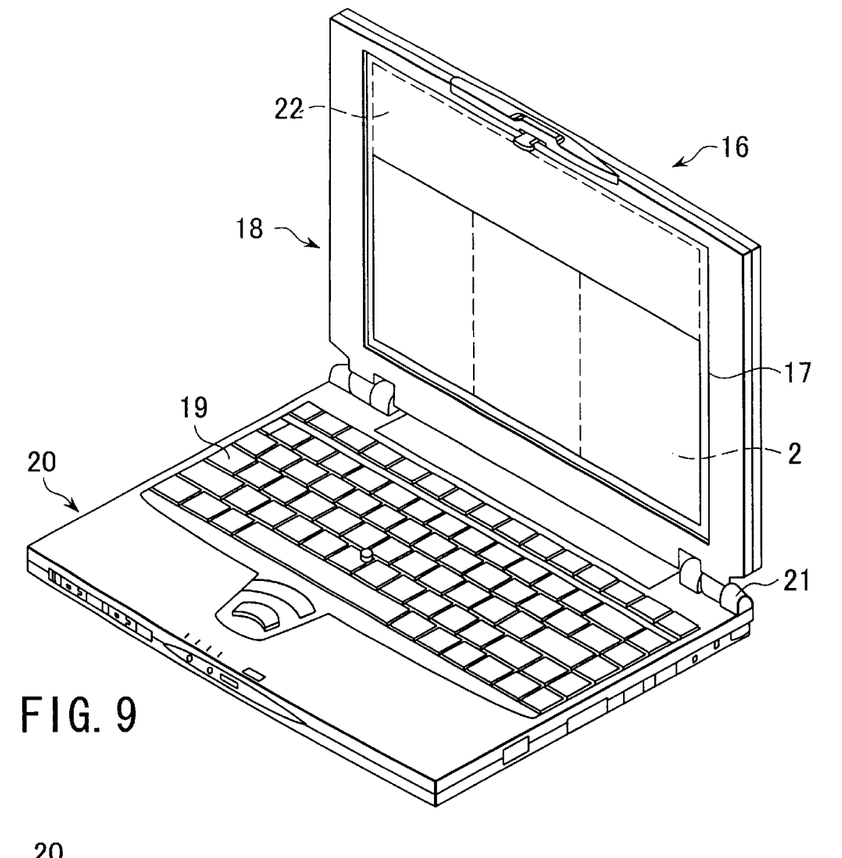
FIG. 9 schematically shows a notebook type electronic computer as another example of a portable electronic appliance of the present invention.

Also, in the embodiment shown in FIGS. 7 to 9, the sheet 22 having a heat conductivity or capable of absorbing the electrolyte is housed in the first body (upper casing) 18. However, the sheet 22 can be housed anywhere desired. For example, the sheet 22 can be housed in the second body (lower casing) 20. If the heat conductive sheet 22 is housed in the second body 20, it is possible to effectively disperse the heat generated from, for example, a CPU and to make the heat generation uniform. Of course, it is also possible to mount the battery pack according to any of the first to third embodiments of the present invention in both the first body and the second body simultaneously.

Examples of the present invention will now be described with reference to the accompanying drawings.

EXAMPLE 1

A battery assembly of a secondary battery unit was prepared by connecting in series three thin type lithium ion secondary batteries and connecting a protective circuit to the positive and negative electrode leads of each of the lithium ion secondary battery. Each secondary battery has a width of 54 mm, a length of 90 mm and a thickness of 3 mm, and comprises a bag-like case consisting essentially of a laminate film including an aluminum foil and having a thickness of 0.1 mm.

The laminate film used included an aluminum film having a thickness of 20 $\mu$m between a PET (biaxially oriented polyester) film and a film containing polypropylene. Also, the length of the diagonal in the smallest rectangle surrounding the secondary battery unit was 207 mm.

An aluminum sheet having a thickness t of 0.3 mm as the heat conductive sheet was arranged on the back surface of a liquid crystal display device forming the display device 17 of the notebook type electronic computer 16 shown in FIG. 9, and the battery assembly was arranged on the aluminum sheet so as to mount the battery. To be more specific, the aluminum sheet was arranged on the surface of the secondary battery unit in a manner to bridge the three secondary batteries and to face the electrode group of each of the secondary batteries with the case interposed therebetween. Since the heat conductivity $\rho$ of the aluminum sheet at 25° C. was 237 [W/mk], the value of 0.1 L/$\rho$ was 0.087 and the value of L/$\rho$ was 0.87. It follows that the thickness t of the aluminum sheet satisfied the formula (2) described previously, i.e., the formula of: 0.1 L/$\rho \leq t \leq$ L/$\rho$.

EXAMPLE 2

Prepared was a notebook type electronic computer substantially equal in construction to that prepared in Example 1, except that a copper sheet having a thickness of 0.3 mm was used as the heat conductive sheet.

Since the heat conductivity $\rho$ of the copper sheet at 25° C. was 400 [W/mk], the value of 0.1 L/$\rho$ was 0.052 and the value of L/$\rho$ was 0.52. It follows that the thickness t of the copper sheet satisfied the formula (2) described previously, i.e., the formula of: 0.1 $L/\rho \leq t \leq L/\rho$.

EXAMPLE 3

Prepared was a notebook type electronic computer substantially equal in construction to that prepared in Example 1, except that a graphite sheet having a thickness of 0.3 mm was used as the heat conductive sheet.

Since the heat conductivity $\rho$ of the graphite sheet at 25° C. was 150 [W/mk], the value of 0.1 L/$\rho$ was 0.138 and the value of L/$\rho$ was 1.38. It follows that the thickness t of the graphite sheet satisfied the formula (2) described previously, i.e., the formula of: 0.1 i/$\rho \leq t \leq$ L/$\rho$.

EXAMPLE 4

Prepared were three electrode groups equal in capacity to those incorporated in the lithium ion secondary battery referred to in Example 1. A polyethylene terephthalate (PET) film, which is a thermoplastic film, was fixed by heat fusion to one surface of an aluminum sheet having a thickness of 0.3 mm, which was used as the heat conductive sheet. Three electrode groups were arranged on the surface of the thermoplastic film, and each of these electrode groups was covered with a laminate film similar to that described previously in conjunction with Example 1. In this step, the positive electrode lead and the negative electrode lead were allowed to extend to the outside of the laminate film. Then, each of the laminate films was thermally fused to the surface of the thermoplastic film so as to prepare a battery pack constructed as shown in FIGS. 4 and 5.

In the next step, the battery pack was arranged on the back surface of a liquid crystal display device constituting the display device 17 of the notebook type electronic computer 16 shown in FIG. 9 such that the aluminum sheet is in contact with the liquid crystal display device.

COMPARATIVE EXAMPLE 1

Prepared was a notebook type electronic computer equal in construction to that referred to in Example 1, except that the heat conductive sheet was not arranged.

The electronic computers prepared in each of Examples 1 to 4 and Comparative Example 1 was left turned on and the time leading to the shut down of the power source of the electronic computer was measured. The result is shown in Table 1 below as the first driving time. Also, the charge-discharge operations were repeated 100 times for the battery pack for each of Examples 1 to 4 and Comparative Example 1, with the battery pack left mounted to the electronic computer, so as to measure the time during which the electronic computer was used in the one hundredth charge-discharge cycle. Table 1 also shows the results.

TABLE 1

| | Case | Heat conductive sheet | Sheet thickness (mm) | First driving time | 100$^{th}$ driving time |
|---|---|---|---|---|---|
| Example 1 | laminate film | Al | 0.3 | 2 hours | 1 hour and 50 minutes |
| Example 2 | laminate film | Cu | 0.3 | 2 hours | 1 hour and 55 minutes |
| Example 3 | laminate film | graphite | 0.3 | 2 hours | 1 hour and 45 minutes |
| Example 4 | partly heat conductive sheet | Al | 0.3 | 2 hours | 1 hour and 50 minutes |
| Comparative Example 1 | laminate film | none | — | 1 hour and 25 minutes | 1 hour |

As apparent from Table 1, the first driving time of the electronic computer for each of Examples 1 to 4 was 2 hours or more, and the one hundredth driving time far exceeded 1 hour. On the other hand, the power source for the electronic computer for Comparative Example 1 was shut down in 1 hour and 25 minutes in the first charge-discharge cycle, and the power source for the electronic computer was shut down in one hour in the one hundredth charge-discharge cycle. The experimental data clearly support that the arrangement of the heat conductive sheet permits making the temperature distribution uniform over the entire secondary battery unit so as to improve both the discharge characteristics and the cycle characteristics of the battery assembly.

After the charge-discharge test, the secondary battery for each of Examples 1 to 4 and Comparative Example 1 was dismantled so as to observe the electrode group. No deterioration was recognized in Examples 1 to 4. However, a prominent deterioration was recognized in Comparative Example 1 in those portions of the electrode group which were close to the back light and the circuit substrate. It is considered reasonable to understand that the thermal deterioration for Comparative Example 1 was derived from the nonuniform temperature distribution within the battery assembly.

EXAMPLE 5

Figure 10:
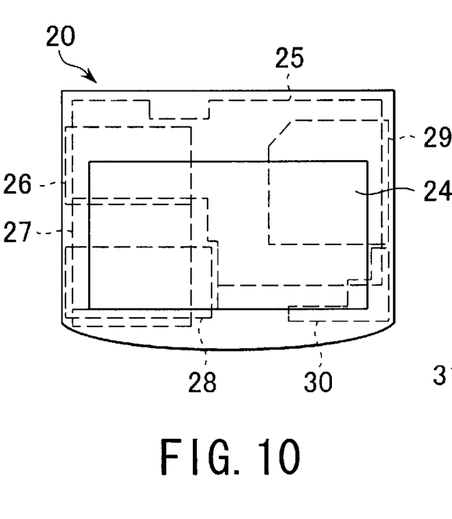
FIG. 10 schematically shows the arrangement of the electronic parts within the second body of a notebook type electronic computer in Example 5 of the present invention.

The battery assembly 24 similar to that referred to in Example 1 was set as the secondary battery unit in the second body 20 of the notebook type electronic computer shown in FIG. 9, i.e., in the portion 20 including the key board. FIG. 10 shows the arrangement of the electronic parts within the second body 20. A system substrate 25 including a CPU is arranged behind the key board 19. Also, a PC card slot 26, a floppy disk drive 27, a hard disk drive 28, a CD-ROM drive 29 and a sound substrate 30 are arranged on the back side of the system substrate 25. Further, the battery assembly 24 used as the secondary battery unit is arranged on the back side of these electronic parts, i.e., the system substrate 25, the PC card slot 26, the floppy disk drive 27, the hard disk drive 28, the CD-ROM drive 29 and the sound substrate 30, in a manner to face these electronic parts.

An aluminum sheet having a thickness of 0.5 mm, which was used as the heat conductive sheet, was arranged on the surface on the side of the electronic parts of the battery assembly 24 in a manner to bridge the three secondary batteries and to face the electrode group of each of the secondary batteries with the case interposed therebetween. Incidentally, the thickness t of the aluminum sheet was found to satisfy the relationship (2) given previously, i.e., the relationship of $0.1L/\rho \leq t \leq L/\rho$.

EXAMPLE 6

Prepared was a notebook type electronic computer substantially equal in construction to that prepared in Example 5, except that a copper sheet having a thickness of 0.5 mm was used as the heat conductive sheet. Incidentally, the thickness t of the copper sheet satisfied the formula (2) described previously, i.e., the formula of: $0.1L/\rho \leq t \leq L/\rho$.

EXAMPLE 7

Prepared was a notebook type electronic computer substantially equal in construction to that prepared in Example 5, except that a graphite sheet having a thickness of 0.5 mm was used as the heat conductive sheet. Incidentally, the thickness t of the graphite sheet satisfied the formula (2) described previously, i.e., the formula of: $0.1L/\rho \leq t \leq L/\rho$.

EXAMPLE 8

Prepared was a notebook type electronic computer substantially equal in construction to that prepared in Example 5, except that used was a battery pack prepared by the method described below.

Specifically, prepared were three electrode groups equal in capacity to those incorporated in the lithium ion secondary batteries referred to in Example 1. Then, a polyethylene terephthalate (PET) film, which is a thermoplastic film, was fixed by heat fusion to one surface of an aluminum sheet having a thickness of 0.5 mm as the heat conductive sheet. The three electrode groups were arranged on the surface of the thermoplastic film, and each of these electrode groups was covered with a laminate film similar to that referred to in Example 1. In this case, the positive electrode lead and the negative electrode lead each connected to the electrode group were allowed to extend to the outside of the laminate film. Then, a battery pack constructed as shown in FIGS. 4 and 5 was prepared by thermally fusing each of the laminate films to the surface of the thermoplastic film.

Incidentally, the battery pack was arranged such that the heat conductive sheet is allowed to face the electronic parts, i.e., the system substrate 25, the PC card slot 26, the floppy disk drive 27, the hard disk drive 28, the CR-ROM drive 29 and the sound substrate 30.

COMPARATIVE EXAMPLE 2

Prepared was a notebook type electronic computer equal in construction to that referred to in Example 5 except that the heat conductive sheet was not arranged.

The electronic computers prepared in each of Examples 5 to 8 and Comparative Example 2 was left turned on and the time leading to the shut down of the power source of the electronic computer was measured. The result is shown in Table 2 below as the first driving time. Also, the charge-discharge operations were repeated 100 times for the battery pack for each of Examples 5 to 8 and Comparative Example 2, with the battery pack left mounted to the electronic computer, so as to measure the time during which the electronic computer was used in the one hundredth charge-discharge cycle. Table 2 also shows the results.

TABLE 2

| | Case | Heat conductive sheet | Sheet thickness (mm) | First driving time | 100$^{th}$ driving time |
|---|---|---|---|---|---|
| Example 5 | laminate film | Al | 0.5 | 2 hours | 1 hour and 50 minutes |
| Example 6 | laminate film | Cu | 0.5 | 2 hours | 1 hour and 55 minutes |
| Example 7 | laminate film | graphite | 0.5 | 2 hours | 1 hour and 45 minutes |
| Example 8 | partly heat conductive sheet | Al | 0.5 | 2 hours | 1 hour and 50 minutes |
| Comparative Example 2 | laminate film | none | — | 1 hour and 20 minutes | 1 hour |

As apparent from Table 2, the first driving time of the electronic computer for each of Examples 5 to 8 was 2 hours or more, and the one hundredth driving time far exceeded 1 hour. On the other hand, the power source for the electronic computer for Comparative Example 2 was shut down in 1 hour and 20 minutes in the first charge-discharge cycle, and the power source for the electronic computer was shut down in one hour in the one hundredth charge-discharge cycle. The experimental data clearly support that the arrangement of the heat conductive sheet permits making the temperature distribution uniform over the entire secondary battery unit so as to improve both the discharge characteristics and the cycle characteristics of the battery assembly.

After the charge-discharge test, the secondary battery for each of Examples 5 to 8 and Comparative Example 2 was dismantled so as to observe the electrode group. No deterioration was recognized in Examples 5 to 8. However, a prominent deterioration was recognized in those portions of the electrode group which were close to the CPU and the hard disk drive. It is considered reasonable to understand that the thermal deterioration for Comparative Example 2 was derived from the nonuniform temperature distribution within the battery assembly.

EXAMPLE 9

A polycarbonate sheet having a thickness of 0.3 mm, which was a sheet capable of absorbing an electrolyte, was arranged on the back surface of a liquid crystal display device providing the display device 17 of the notebook type electronic computer 16 shown in FIG. 9, and a battery assembly similar to that referred to in Example 1 was arranged on the polycarbonate sheet so as to mount a battery. To be more specific, the polycarbonate sheet was arranged on the surface of the secondary battery unit in a manner to bridge the three secondary batteries and face the electrode group of each of the secondary batteries with a case interposed therebetween.

EXAMPLE 10

Prepared was a notebook type electronic computer similar in construction to that referred to in Example 9, except that an ethyl acrylate sheet having a thickness of 0.3 mm was used as the electrolyte absorbing sheet.

EXAMPLE 11

Prepared was a notebook type electronic computer similar in construction to that referred to in Example 9, except that a polyethylene oxide sheet having a thickness of 0.3 mm was used as the electrolyte absorbing sheet.

EXAMPLE 12

Prepared was a notebook type electronic computer similar in construction to that referred to in Example 9, except that a polypropylene oxide sheet having a thickness of 0.3 mm was used as the electrolyte absorbing sheet.

A pin hole was formed intentionally in the case of the battery mounted in the notebook type electronic computer prepared in each of Examples 9 to 12 and Comparative Example 1 so as to cause leakage of the nonaqueous electrolyte. The state of diffusion of the nonaqueous electrolyte was observed, with the result as shown in Table 3 below:

TABLE 3

| | Case | Electrolyte absorbing sheet | Leakage of electrolyte |
| --- | --- | --- | --- |
| Example 9 | laminate film | polycarbonate | no circuit corrosion |
| Example 10 | laminate film | ethyl acrylate | no circuit corrosion |
| Example 11 | laminate film | polyethylene oxide | no circuit corrosion |
| Example 12 | partly heat conductive sheet | polypropylene oxide | no circuit corrosion |
| Comparative Example 1 | laminate film | none | circuit corroded |

As apparent from Table 3, the leaking nonaqueous electrolyte was completely absorbed by the electrolyte absorbing sheet in each of Examples 9 to 12, with the result that the nonaqueous electrolyte was not diffused in the circuit substrate section. In Comparative Example 1, however, the nonaqueous electrolyte was diffused so as to corrode the circuit of the circuit substrate section. The experimental data clearly support that the arrangement of the electrolyte absorbing sheet permits protecting the internal circuit of the electronic appliance from the electrolyte leakage.

EXAMPLE 13

Prepared was a notebook type electronic computer similar in construction to that referred to in Example 9, except that an acrylic acid sheet having a thickness of 0.3 mm and containing a modacrylic fiber as a flame retardant polymeric material was used as an electrolyte absorbing sheet.

A pin hole was formed intentionally in the case of the set battery so as to cause the nonaqueous electrolyte to leak from within the battery. However, the leaking nonaqueous electrolyte was completely absorbed by the electrolyte absorbing sheet so as not to be diffused in the circuit substrate section. Then, the battery assembly within the electronic appliance was intentionally short-circuited. However, the sheet holding the nonaqueous electrolyte was not ignited.

EXAMPLE 14

Figure 11:
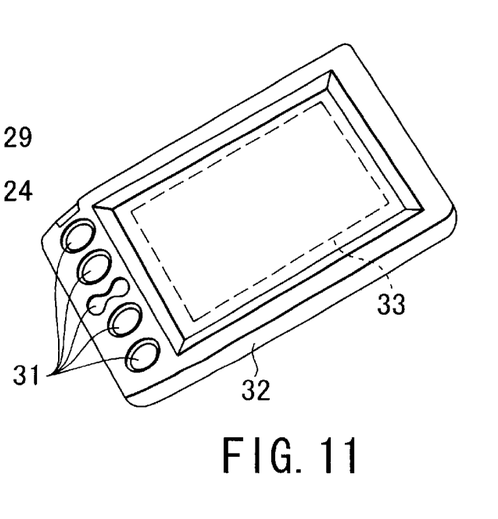
FIG. 11 schematically shows a personal digital assistant in Example 14 of the present invention.
Figure 12:
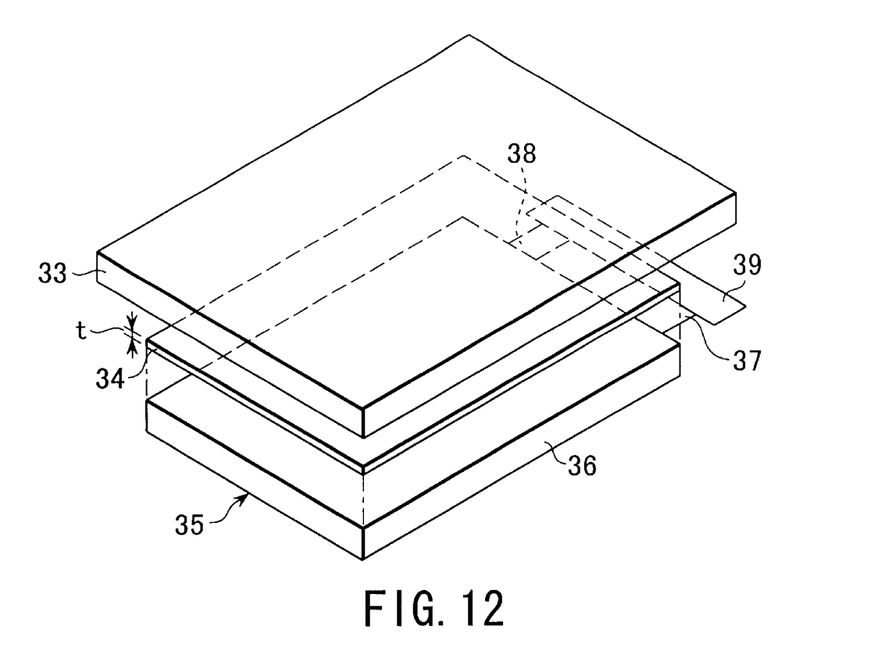
FIG. 12 schematically shows the positional relationship between the display device and the battery pack in the personal digital assistant shown in FIG. 11.
Figure 13:
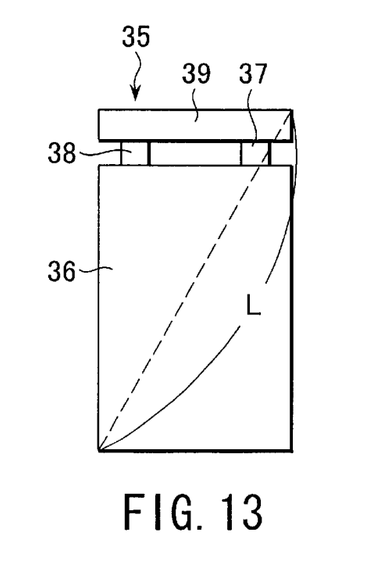
FIG. 13 is a plan view of the secondary battery unit shown in FIG. 12.

Prepared was a PDA (personal digital assistant) constructed as shown in FIGS. 11 to 13.

The personal digital assistant comprises a main body 32 equipped with an operating button 31, a display device 33 incorporated in the main body 32, a heat conductive sheet 34 arranged on the back surface of the display device 33, and a secondary battery unit 35 arranged on the back surface of the heat conductive sheet 34.

A liquid crystal display device (LCD) equipped with, for example, a liquid crystal cell and a booster circuit was used as the display device 33. An aluminum sheet having a thickness t of, for example, 0.2 mm was used as the heat conductive sheet 34. A thin type lithium ion secondary battery was used in the secondary battery unit. The thin type lithium ion secondary battery comprises a case 36 having an electrode group housed therein, a positive electrode lead 37 having one end connected to the electrode group and having the other end extending to the outside of the case 36, a negative electrode lead 38 having one end connected to the electrode group and having the other end extending to the outside of the case 36, and a protective circuit 39 to which the positive electrode lead 37 and the negative electrode 38 are connected. Also, the secondary battery was sized at 54 mm in width, 90 mm in height, 3 mm in thickness and 112 mm in length L of the diagonal. The case 36 was formed essentially of a laminate film similar to that referred to in Example 1.

The aluminum sheet 34 was located on the surface of the secondary battery unit 35 in a manner to face the electrode group with the case 36 interposed therebetween.

The heat conductivity $\rho$ of the aluminum sheet 34 at 25° C. was 237 [W/mk], the value of 0.1 L/$\rho$ was 0.047, and the value of L/$\rho$ was 0.47. It follows that the thickness t of the aluminum sheet 34 satisfied the formula (2) of: 0.1 L/$\rho \leq t \leq$ L/$\rho$.

EXAMPLE 15

Prepared was a personal digital assistant similar in construction to that referred to in Example 14, except that a copper sheet having a thickness t of 0.2 mm was used as the heat conductive sheet 34.

The heat conductivity $\rho$ of the copper sheet 34 at 25° C. was 400 [W/mk], the value of 0.1 L/$\rho$ was 0.028, and the value of L/$\rho$ was 0.28. It follows that the thickness t of the copper sheet 34 satisfied the formula (2) of: 0.1 L/$\rho \leq t \leq$ L/$\rho$.

EXAMPLE 16

Prepared was a personal digital assistant similar in construction to that referred to in Example 14, except that a graphite sheet having a thickness t of 0.2 mm was used as the heat conductive sheet 34.

The heat conductivity ρ of the graphite sheet 34 at 25° C. was 150 [W/mk], the value of 0.1 L/ρ was 0.075, and the value of L/ρ was 0.75. It follows that the thickness t of the graphite sheet 34 satisfied the formula (2) of: 0.1 L/ρ≦t≦L/ρ.

COMPARATIVE EXAMPLE 3

Prepared was a PDA (personal digital assistant) equal in construction to that referred to in Example 14 except that the heat conductive sheet 34 was not arranged.

The PDA's prepared in each of Examples 14 to 16 and Comparative Example 3 was left turned on and the time leading to the shut down of the power source of the PDA was measured. The result is shown in Table 4 below as the first driving time. Also, the charge-discharge operations were repeated 100 times for the PDA for each of Examples 14 to 16 and Comparative Example 3, with the battery left mounted to the PDA, so as to measure the time during which the PDA was used in the one hundredth charge-discharge cycle. Table 4 also shows the results.

TABLE 4

| | Heat conductive sheet | Sheet thickness (mm) | First driving time | 100th driving time |
|---|---|---|---|---|
| Example 14 | aluminum foil | 0.2 | 10 hours | 9 hours and 20 minutes |
| Example 15 | copper foil | 0.2 | 10 hours | 9 hours and 30 minutes |
| Example 16 | graphite foil | 0.2 | 10 hours | 9 hours and 10 minutes |
| Comparative Example 3 | none | — | 9 hours | 7 hours |

As apparent from Table 4, concerning the PDA for each of Examples 14 to 16, the first driving time was found to be 10 hours or more, and the one hundredth driving time was found to be 9 hours or more. On the other hand, concerning the PDA for Comparative Example 3, the power source was shut down in about 9 hours in the first driving, and the power source was shut down in about 7 hours in the one hundredth driving. If the PDA is driven, heat is generated from mainly the booster circuit arranged within the liquid crystal display device 33. Where the heat conductive sheet 34 is arranged between the liquid crystal display device 33 and the secondary battery unit 35 as in Examples 14 to 16 of the present invention, however, the heat generated from the liquid crystal display device 33 is transmitted to the secondary battery unit 35 through the heat conductive sheet 34 so as to decrease the difference in temperature within the secondary battery unit 35. It follows that it is possible to improve the discharge characteristics and the cycle characteristics of the secondary battery unit 35.

EXAMPLES 17 TO 21

Prepared was a notebook type electronic computer similar in construction to that referred to in Example 1, except that the thickness t of the heat conductive sheet was changed as shown in Table 5 below.

The electronic computers prepared in each of Examples 17 to 21 was left turned on and the time leading to the shut down of the power source of the electronic computer was measured. The result is shown in Table 5 below as the first driving time. Also, the charge-discharge operations were repeated 100 times for the electronic computer for each of Examples 17 to 21, with the battery pack left mounted to the electronic computer, so as to measure the time during which the electronic computer was used in the one hundredth charge-discharge cycle. Table 5 also shows the results.

TABLE 5

| | 0.1 L/ρ (mm) | L/ρ (mm) | Thickness t of heat conductive sheet (mm) | First driving time | 100th driving time |
|---|---|---|---|---|---|
| Example 17 | 0.087 | 0.87 | 0.025 | 1 hour and 50 minutes | 1 hour and 10 minutes |
| Example 18 | 0.087 | 0.87 | 0.050 | 2 hours | 1 hour and 20 minutes |
| Example 19 | 0.087 | 0.87 | 0.075 | 2 hours | 1 hour and 30 minutes |
| Example 20 | 0.087 | 0.87 | 0.1 | 2 hours | 1 hour and 50 minutes |
| Example 1 | 0.087 | 0.87 | 0.3 | 2 hours | 1 hour and 50 minutes |
| Example 21 | 0.087 | 0.87 | 0.5 | 2 hours | 1 hour and 50 minutes |

As apparent from Table 5, the charge-discharge characteristics of the battery assembly was markedly improved in the electronic computer for each of Examples 1, 20 and 21, in which the thickness t of the heat conductive sheet was not smaller than 0.1 mm.

EXAMPLE 22

Figure 14:
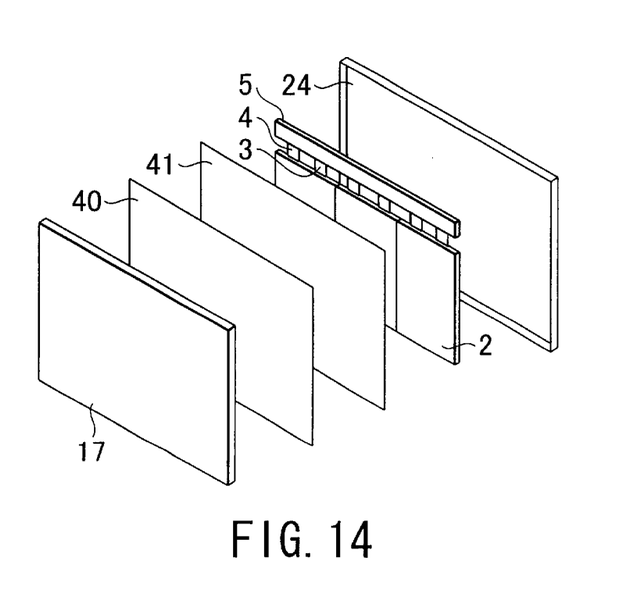
FIG. 14 schematically shows the positional relationship between the display device section and the battery pack in the notebook type electronic computer in Example 22 of the present invention.

A heat conductive sheet 40 consisting of a copper sheet having a thickness of 0.3 mm was arranged on the back surface of a liquid crystal display device constituting the display device 17 of the notebook type electronic computer shown in FIG. 9, followed by further arranging an electrolyte absorbing sheet 41 consisting of a polycarbonate sheet having a thickness of 0.3 mm on the back surface of the heat conductive sheet 40, as shown in FIG. 14. Further, a battery assembly similar in construction to that referred to in Example 1 was arranged as a secondary battery unit on the back surface of the polycarbonate sheet 41, thereby mounting a battery pack.

The charge-discharge cycles were repeatedly applied 100 times to the notebook type electronic computer thus prepared, with the battery pack left mounted to the electronic computer so as to measure the time during which the electronic computer was operated in the one hundredth cycle. The driving time for the one hundredth cycle was found to be not shorter than 2 hours. Also, a pin hole was intentionally formed in the case of the battery assembly so as to cause the leakage of the nonaqueous electrolyte. When the diffused state of the nonaqueous electrolyte was observed, it was confirmed that the leaking nonaqueous electrolyte was absorbed by the electrolyte absorbing sheet, with the result that the nonaqueous electrolyte was not diffused in the circuit substrate section.

Incidentally, the arrangement of the electrolyte absorbing sheet 41 and the heat conducting sheet 40 was reversed. In other words, the heat conductive sheet was arranged on the surface of the battery assembly. In this case, it was difficult for the electrolyte absorbing sheet 41 to absorb completely the nonaqueous electrolyte leaking from within the battery assembly.

As described above in detail, the present invention provides a battery pack having a long cycle life and a portable electronic appliance in which the particular battery pack of the present invention is used. The present invention also provides a battery pack capable of suppressing the diffusion of the leaking electrolyte to the outside and a portable electronic appliance in which the particular battery pack of the present invention is used.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery pack, comprising:
    a secondary battery unit including at least one secondary battery, the at least one secondary battery comprising an electrode group and an insulating case having the electrode group housed therein; and
    a heat conductive sheet provided at at least a part of the surface of the secondary battery unit and having a heat conductivity higher than a heat conductivity of the case.

2. The battery pack according to claim 1, wherein the heat conductivity of the heat conductive sheet at 25° C. is at least 100 [W/mk], and the thickness of the heat conductive sheet meets formula (1) given below:

$$0.1 L/\rho \leq t \quad (1)$$

where t represents the thickness [mm] of the heat conductive sheet, L represents the length [mm] of the diagonal of the secondary battery unit, and ρ represents the heat conductivity [W/mk] of the heat conductive sheet at 25° C.

3. The battery pack according to claim 1, wherein the heat conductivity of the heat conductive sheet at 25° C. is at least 100 [W/mk], and the thickness of the heat conductive sheet meets formula (2) given below:

$$0.1 L/\rho \leq t \leq L/\rho \quad (2)$$

where t represents the thickness [mm] of the heat conductive sheet, L represents the length [mm] of the diagonal of the secondary battery unit, and ρ represents the heat conductivity [W/mk] of the heat conductive sheet at 25° C.

4. The battery pack according to claim 1, wherein the heat conductive sheet contains at least one kind of material selected from the group consisting of aluminum, copper and carbon.

5. The battery pack according to claim 1, wherein the case is formed essentially of a laminate film containing an aluminum layer having a thickness of 20 to 40 μm.

6. The battery pack according to claim 1, wherein, the heat conductive sheet is arranged on at least a part of the surface of the secondary battery unit.

7. The battery pack according to claim 1, wherein an electrolyte absorbing sheet is arranged between the secondary battery unit and the heat conductive sheet.

8. The battery pack according to claim 1, wherein the secondary battery unit comprises a plurality of secondary batteries, and the heat conductive sheet is arranged to bridge the plural secondary batteries.

9. A portable electronic appliance using a secondary battery unit including at least one secondary battery, the at least one secondary battery comprising an electrode group and an insulating case having the electrode group housed therein, comprising:
    a battery housing section in which a secondary battery unit is arranged; and
    a heat conductive sheet arranged within the battery housing section and having a heat conductivity higher than a heat conductivity of the case.

10. The portable electronic appliance according to claim 9, wherein the heat conductive sheet contains at least one material selected from the group consisting of aluminum, copper and carbon.

11. The portable electronic appliance according to claim 9, wherein the thickness of the heat conductive sheet falls within a range of between 0.01 mm and 3 mm.

12. The portable electronic appliance according to claim 9, further comprising an electrolyte absorbing sheet arranged within the battery housing section.

13. The portable electronic appliance according to claim 9, wherein the heat conductivity of the heat conductive sheet at 25° C. is at least 100 [W/mk], and the thickness of the heat conductive sheet meets formula (1) given below:

$$0.1 L/\rho \leq t \quad (1)$$

where t represents the thickness [mm] of the heat conductive sheet, L represents a length [mm] of a diagonal of a secondary battery unit, and ρ represents the heat conductivity [W/mk] of the heat conductive sheet at 25° C.

14. A battery pack, comprising:
    a heat conductive sheet;
    a thermoplastic film arranged on the heat conductive sheet;
    an electrode group arranged on the thermoplastic film; and
    a film material thermally fused to the thermoplastic film in a manner to cover the electrode group so as to seal the electrode group.

15. The battery pack according to claim 14, wherein the heat conductive sheet contains at least one material selected from the group consisting of aluminum, copper and carbon and has a thickness falling within a range of between 0.01 mm and 3 mm.

16. A battery pack, comprising:
    a secondary battery unit including at least one secondary battery comprising an electrolyte; and
    an electrolyte absorbing sheet arranged on at least a part of the surface of the secondary battery unit.

17. The battery pack according to claim 16, wherein the electrolyte absorbing sheet contains at least one material selected from the group consisting of polycarbonate, ethyl acrylate, methyl methacrylate, polyethylene oxide and polypropylene oxide.

* * * * *